United States Patent
Farooq et al.

(10) Patent No.: US 10,179,489 B2
(45) Date of Patent: Jan. 15, 2019

(54) TOW-HOOK ASSEMBLY

(71) Applicant: Ford Global Technologies, LLC, Dearborn, MI (US)

(72) Inventors: S. M. Iskander Farooq, Novi, MI (US); Srinivasan Sundararajan, Ann Arbor, MI (US); Nirmal Muralidharan, Birmingham, MI (US); Marwan Ahmad Elbkaily, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 15/431,448

(22) Filed: Feb. 13, 2017

(65) Prior Publication Data
US 2018/0229562 A1    Aug. 16, 2018

(51) Int. Cl.
| B60D 1/56 | (2006.01) |
| B60R 19/48 | (2006.01) |
| B60R 21/34 | (2011.01) |
| B60R 21/00 | (2006.01) |

(52) U.S. Cl.
CPC .............. B60D 1/565 (2013.01); B60R 19/48 (2013.01); B60R 21/34 (2013.01); *B60R 2021/0051* (2013.01); *B60R 2021/0053* (2013.01)

(58) Field of Classification Search
CPC .................................. B60D 1/56; B60D 1/565
See application file for complete search history.

(56) References Cited

U.S. PATENT DOCUMENTS

| 1,366,353 | A | | 1/1921 | Betts |
| 1,427,624 | A | | 8/1922 | Newton |
| 1,574,552 | A | | 2/1926 | Chapman |
| 1,632,922 | A | | 6/1927 | Sagar |
| 1,695,096 | A | | 12/1928 | Hanses |
| 2,714,019 | A | | 7/1955 | Williams et al. |
| 3,182,962 | A | | 5/1965 | Gray |
| 4,127,295 | A | | 11/1978 | Robinson |
| 4,961,604 | A | | 10/1990 | Kisner |
| 5,215,325 | A | | 6/1993 | Novotny et al. |
| 5,791,633 | A | | 8/1998 | Walker |
| 5,967,539 | A | | 10/1999 | Digman |
| 5,979,953 | A | | 11/1999 | Rinehart |
| 6,604,884 | B1 | * | 8/2003 | Ohkura ................... B60D 1/56 403/187 |
| 6,802,522 | B1 | * | 10/2004 | Park ....................... B60D 1/243 280/495 |

(Continued)

FOREIGN PATENT DOCUMENTS

| DE | 4008467 A1 | 9/1991 |
| JP | 2009292175 A | * 12/2009 |

(Continued)

*Primary Examiner* — Kevin Hurley
(74) *Attorney, Agent, or Firm* — Jason Rogers; Brooks Kushman, P.C.

(57) ABSTRACT

A tow-hook assembly may include a vehicle frame and a bumper arranged thereon, and a tow-hook assembly configured to attach to the vehicle bumper and provide a tow-hook. The assembly may include a bracket defining an opening configured to receive the tow-hook, and a brace attached to a backside of the bracket and including a projection extending through the opening to the opposite side of the bracket.

17 Claims, 4 Drawing Sheets

(56) References Cited

U.S. PATENT DOCUMENTS

| | | | | |
|---|---|---|---|---|
| 6,979,016 B1 * | 12/2005 | Wegener | ............ | B60D 1/56 |
| | | | | 280/495 |
| 7,758,060 B2 * | 7/2010 | Lopez | ............ | B60D 1/488 |
| | | | | 280/495 |
| 8,011,704 B2 | 9/2011 | Nees et al. | | |
| 8,276,884 B2 | 10/2012 | Rusiniak | | |
| 8,308,184 B2 * | 11/2012 | Hodoya | ............ | B60D 1/56 |
| | | | | 280/495 |
| 8,684,390 B1 | 1/2014 | Barrette | | |
| 8,820,804 B2 * | 9/2014 | Shibata | ............ | B60R 19/18 |
| | | | | 293/117 |
| 2017/0349016 A1 * | 12/2017 | Jordan | ............ | B60D 1/52 |

FOREIGN PATENT DOCUMENTS

| | | | |
|---|---|---|---|
| KR | 20110100057 A * | 9/2011 | |
| WO | 03051654 A1 | 6/2003 | |

\* cited by examiner

US 10,179,489 B2

TOW-HOOK ASSEMBLY

TECHNICAL FIELD

Disclosed herein are tow-hook assemblies.

BACKGROUND

Automotive vehicles may be equipped with tow-hooks to allow a tow strap or chain to be secured to the vehicle frame. Such tow-hooks allow the vehicle to tow an object, or for the vehicle to be towed by another vehicle. Tow-hooks are commonly secured to the vehicle frame by welding the tow-hook to a mounting plate, and then welding the mounting plate to a surface on the vehicle frame to ensure a strong connection between the tow-hook and the vehicle's frame, providing the strength necessary for the tow-hook to be used to tow loads or support the towing of the vehicle by another vehicle.

SUMMARY

A tow-hook assembly for a vehicle may include a bracket defining an opening configured to receive a hook, and a brace attached to a backside of the bracket and including a projection extending through the opening to an opposite side of the bracket. The brace includes a support extending from the projection and configured to attach to a portion of the hook to recess the hook within the bracket.

A tow-hook assembly may include a vehicle frame and a bumper arranged thereon and a tow-hook assembly configured to attach to the vehicle bumper and provide a tow-hook. The assembly includes a bracket defining an opening configured to receive the tow-hook, and a brace attached to a backside of the bracket and including a projection extending through the opening to the opposite side of the bracket.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Tow-hooks are used to secure a vehicle to a tow-line. When these hooks are attached to a front of a vehicle, a portion of the tow-hook often protrudes from the front of the bumper. This portion of the tow-hook may be inconvenient to pedestrians and may result in the pedestrian's legs and knees coming into contact with the protruding part.

Several regulatory agencies may impose requirements on the tow-hooks, specifically those arranged in the front of a vehicle, to prevent contact with pedestrians. For example, the global pedestrian protection technical regulatory requirements, known as GTR 9, may dictate a maximum allowable knee shear impact criteria during a pedestrian impact with a vehicle. In another example, European New Car Assessment Program (EUNCAP) may impose a five-star rating system to grade various tow-hooks. The National Highway Traffic Safety Administration (NHTSA) has also proposed a five-star rating system. Vehicles with protruding tow-hooks arranged in a front of a vehicle may fail to meet these requirements. Thus, a tow-hook assembly that is pedestrian friendly and meets regulatory and NCAP requirements may be beneficial.

Described herein is a tow-hook assembly configured to recess a tow-hook within the bumper to avoid contact with pedestrians. The tow-hook may be easily accessible, but not unduly protrude from a vehicle bumper. This may be achieved by attaching the hook to a brace and bracket arrangement whereby the brace may recess the hook within the bracket. The bracket may subsequently be attached to the vehicle bumper.

Figure 1:
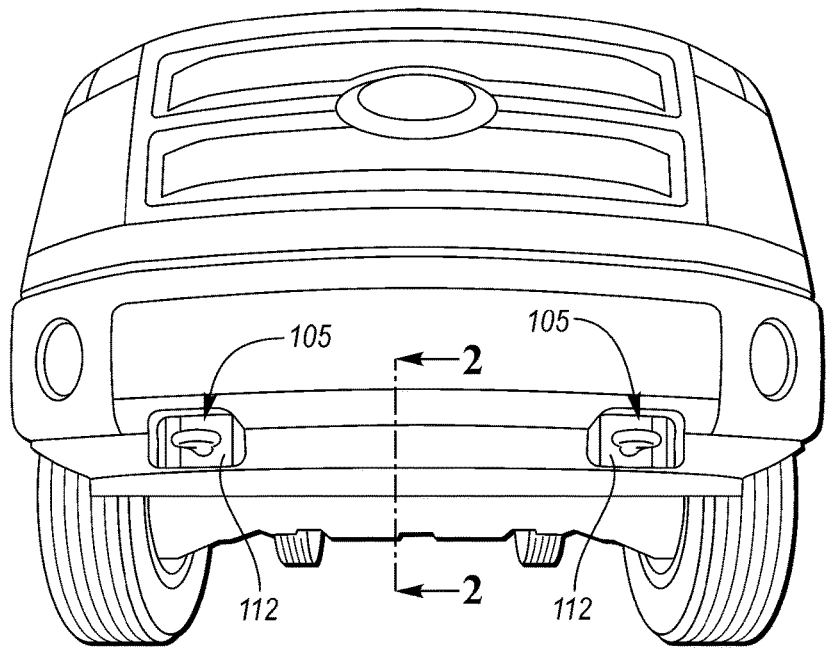
FIG. 1 illustrates an example vehicle having a tow-hook assembly arranged on a front of the vehicle.

FIG. 1 illustrates a vehicle 100 having a tow-hook assembly 105 arranged on a front of the vehicle 100. In the example in FIG. 1, the tow-hook assembly 105 includes a pair of assemblies arranged on the front of the vehicle 100. The tow-hook assembly 105 may be arranged within a bumper beam 110 and may be recessed or stored within the bumper beam 110 to avoid contact with a pedestrian's leg. The tow-hook assembly 105 may be accessible via an opening 112 within the bumper beam. Although FIG. 1 illustrates the tow-hook assemblies 105 as being arranged on the front of the vehicle 100, the tow-hook assemblies 105 may also be arranged on a rear of the vehicle 100.

Figure 2:
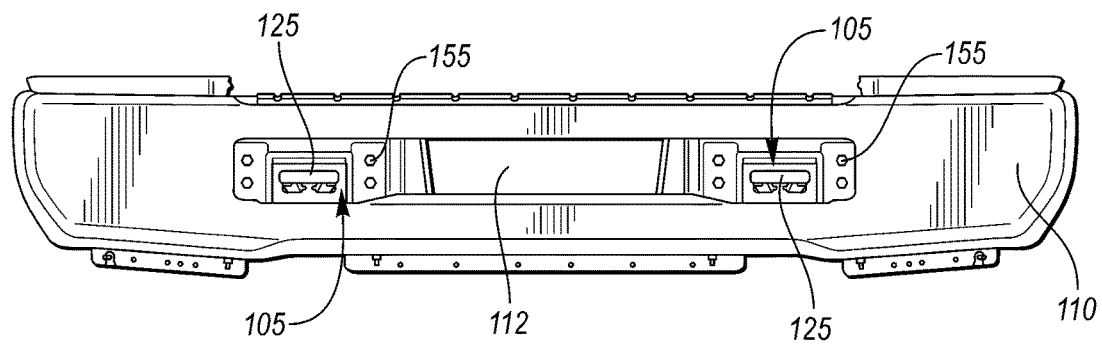
FIG. 2 illustrates a front perspective view of an example tow-hook assembly arranged in the bumper beam.
Figure 3:
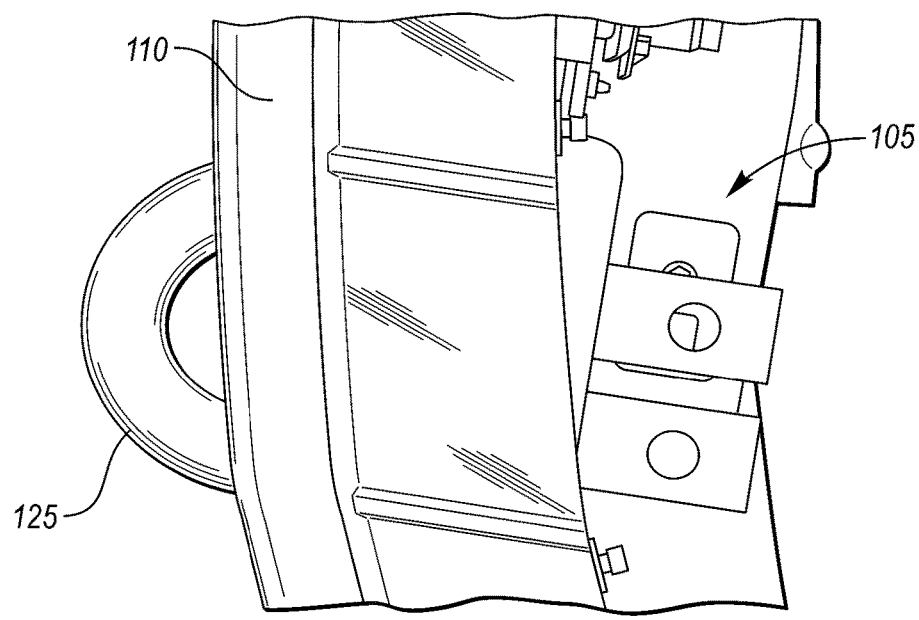
FIG. 3 illustrates a side view of the example tow-hook assembly.

FIG. 2 illustrates a front perspective view of an example tow-hook assembly arranged in the bumper beam 110. FIG. 3 illustrates a cross-sectional side view of the tow-hook assembly arranged in the bumper beam 110. The tow-hook assembly 105 may be arranged behind the bumper beam 110.

The tow-hook assembly 105 may include a hook 125 configured to connect to a strap or chain during towing. The hook 125 may be made from metal or forged steel and designed to hold up to the vehicle maximum load of towing (e.g., 10,000 pounds of towing). The hook 125 may be configured to receive a strap or cable during towing. Various shapes and types of tow-hooks may be implemented. For example, the hook 125 may form a continuous form such as a rectangle or oval. The hook 125 may also form an open hook-type shape. The hook 125 may be a D-rink, a shackle or a tow-ring.

The hook 125 may extent from the bumper beam 110 through the opening 112 to be accessible at the exterior of the vehicle. The hook 125 may extend, for example, approximately 35 mm from the bumper beam 110, with a portion of the hook 125 remaining within the bumper beam 110.

Figure 4:
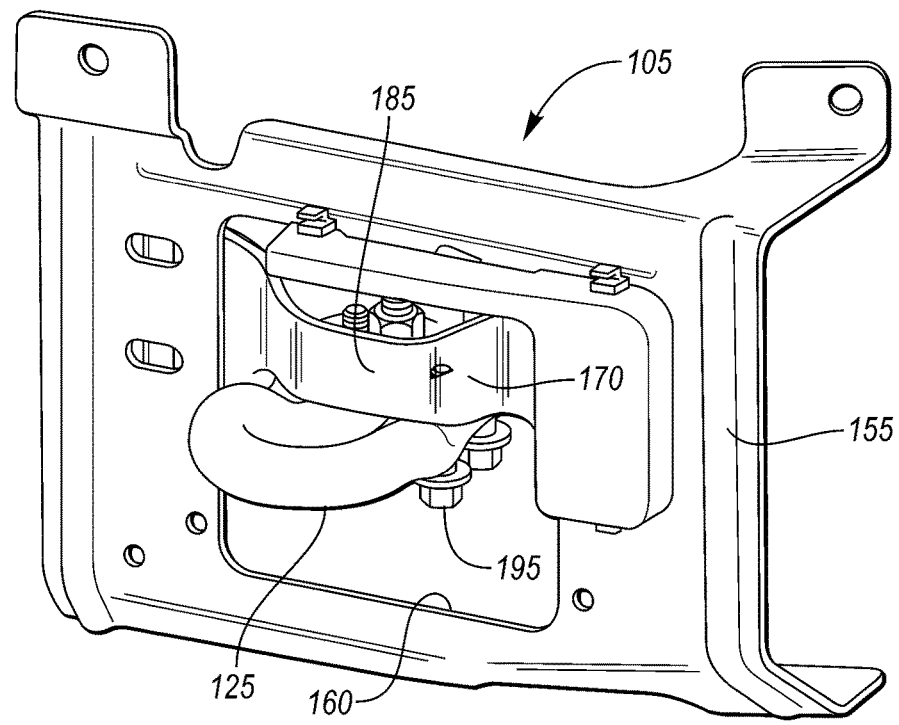
FIG. 4 illustrates a front perspective view of the tow-hook assembly.
Figure 5:
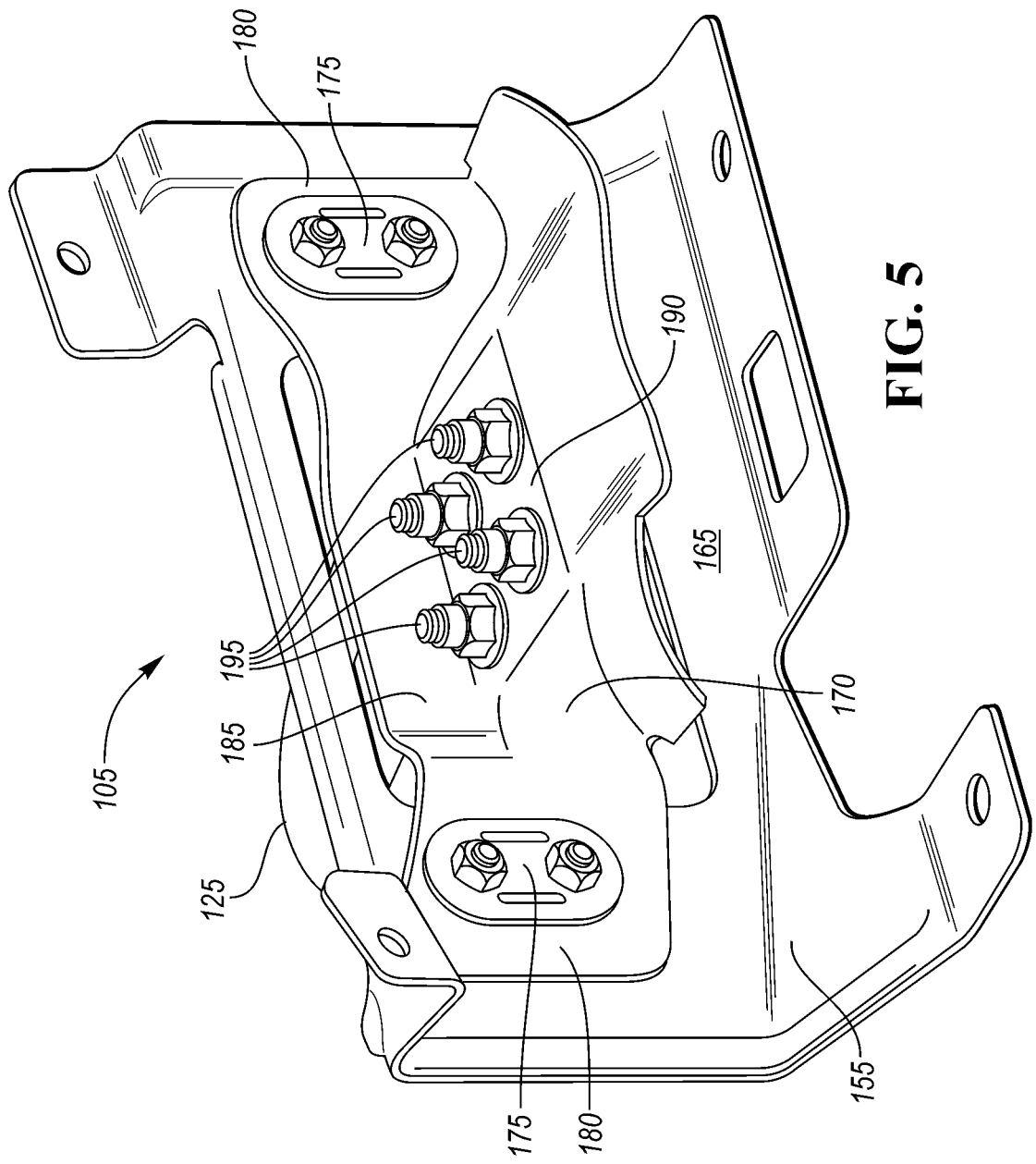
FIG. 5 illustrates a rear perspective view of the tow-hook assembly.

FIG. 4 illustrates a front view of the example tow-hook assembly 105. FIG. 5 illustrates a rear view of the tow-hook assembly 105. The tow-hook assembly 105 may include at least one reinforcement bracket 155. The reinforcement bracket 155 may be a bracket configured to attach to a frame (not shown) arranged behind the bumper beam 110. The bracket 155 may define a bracket opening 160 for receiving the hook 125 there through.

A brace 170 may be arranged on a backside 165 of the bracket 155. The brace 170 attaches the hook 125 to the bracket 155. The brace 170 may include a first portion 180 configured to attach to the backside 165 of the bracket 155. The first portion 180 may attach to the bracket 155 at one or both sides of the opening 160 on the backside 165 of the bracket 155. The brace 170 may be attached via an attachment mechanism 175. The attachment mechanism 175 may include a bolt or screw configured to connect the first portion 180 to the backside 165 of the bracket 155. The brace 170 may also be welded, stamped, or otherwise attached to the bracket 155.

The brace 170 may include a projection 185 configured to extend from the backside 165 of the bracket 155 through the opening 160 of the bracket. The projection 185 may extend beyond the bracket 155, but may not extend outside of the bumper beam 110 when installed. That is, from the side view, as shown in FIG. 3, the projection 185 may not be visible. The projection 185 may be curved and forming a generally semi-circular shape. The projection 185 may extend from the backside 165, through the opening 160 to the opposite side of the bracket 155.

The brace 170 and the bracket 155 may be formed from metal, or another hard material capable of withstanding forces applied during use of the hook 125.

The projection 185 may be visible from the exterior of the vehicle 100. The projection 185 may cover a portion of the opening 160 and provide a more aesthetically appealing appearance to the vehicle 100. The projection 185 may also prevent debris from entering the vehicle behind the bumper beam 110.

The brace 170 may include a support portion 190 extending inwardly from the projection 185 and be arranged behind the opening 160. The support portion 190 may be generally perpendicular with the projection 185 and may form a flat surface. The flat surface of the support portion 190 may be configured to receive a portion of the hook 125 so that the hook may attach to the support portion 190. In the example shown in FIG. 5, the hook 125 may be attached to an underside of the support portion 190.

The hook 125 may be attached to the support portion 190 via at least on hook attachment 195. The hook attachment 195 may include a plurality of bolts, nuts and/or washers configured to attach the support portion 190 to the hook 125. Additionally or alternatively, the hook 125 may be welded, stamped, adhered, etc., to the support portion 190.

The brace 170 may allow the hook 125 to be recessed within the bracket 155. This allows the protrusion of the hook 125 out of the bumper beam 110 to be less than that of an arrangement where hook 125 is attached directly to a vehicle frame. The bracket 155 and brace 170 arrangement allow the hook 125 to be sufficiently secured to the inside of a bumper beam 110 without the hook 125 unduly protruding from the bumper beam 110. That is, the hook 125 is capable of being positioned further rearward compared to traditional arrangements.

Figure 6A:
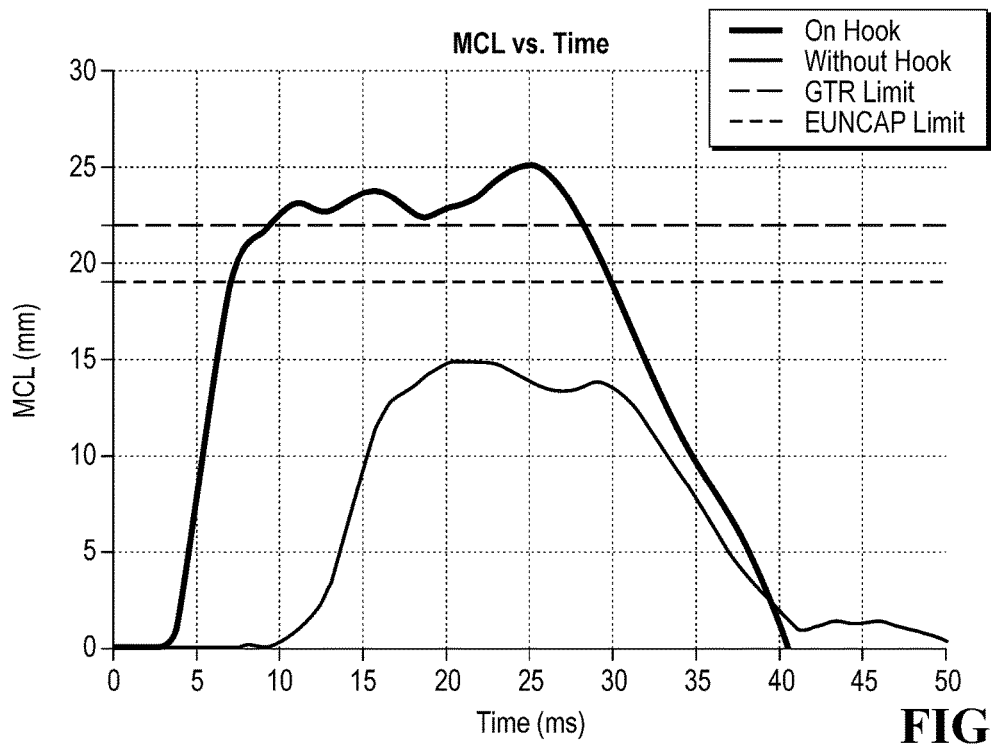
FIG. 6A illustrates an example impact on a pedestrian's medial collateral ligament (MCL) over time.
Figure 6B:
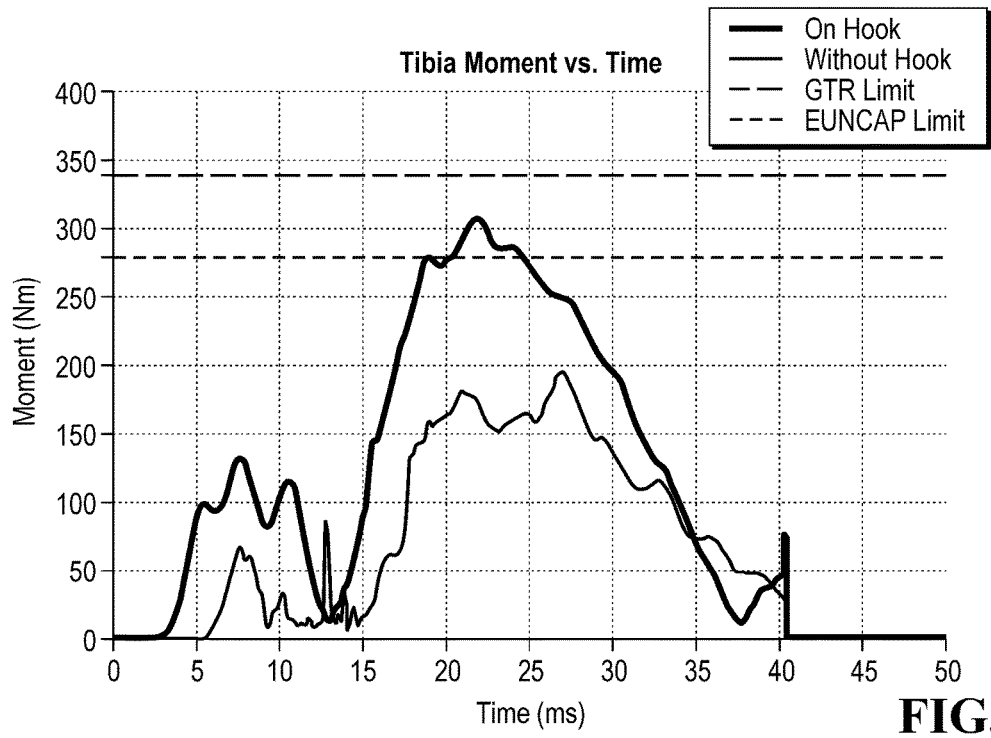
FIG. 6B illustrates an example impact on a pedestrian's tibia over time.

FIGS. 6A and 6B illustrate an effect of a tow-hook on a portion of a pedestrian's lower leg. FIG. 6A illustrates an example impact on a pedestrian's medial collateral ligament (MCL) over time. The impact may be measured in millimeters. FIG. 5A illustrates example GTR and EUNCAP regulatory limits. As can be seen in FIG. 3A, a vehicle having a protruding hook may recognize impacts on the MCL that are above what is permissible under the regulatory limits.

FIG. 6B illustrates an example impact on a pedestrian's tibia over time. Example GTR and EUNCAP regulatory limits are also shown. As can be seen in FIG. 3A, a vehicle having a protruding hook may recognize impacts on the tibia that are above what is permissible under the regulatory limits.

Accordingly, described herein is a tow-hook assembly that protects pedestrian legs and limits impact thereto by including a retractable hook storable within a vehicle bumper beam.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that may not be explicitly illustrated or described.

What is claimed is:

1. A tow-hook assembly for a vehicle, comprising:
   a bracket defining an opening configured to receive a hook; and
   a brace attached to at each side of the opening on a backside of the bracket via at least one attachment mechanism and including a projection extending through the opening to an opposite side of the bracket, the brace including a support extending from the projection and configured to attach to a portion of the hook to recess the hook within the bracket.

2. The assembly of claim 1, the projection forming a semi-circular shape within the opening of the bracket.

3. The assembly of claim 1, the support extending perpendicularly inward from the backside of the bracket to recess the hook within the bracket.

4. The assembly of claim 1, wherein the brace is welded to the bracket.

5. The assembly of claim 1, wherein a distal end of the hook is attached to the support via at least one bolt.

6. A tow-hook assembly, comprising:
a vehicle frame and a bumper arranged thereon; and
a tow-hook assembly configured to attach to the vehicle bumper and provide a tow-hook, the assembly including a bracket defining an opening configured to receive the tow-hook; and
a brace attached to a backside of the bracket and including a projection extending through the opening to the opposite side of the bracket.

7. The assembly of claim 6, the brace including a support extending from the projection and configured to attach to a portion of the hook to recess the hook within the bracket.

8. The assembly of claim 7, the projection forming a semi-circular shape within the opening of the bracket.

9. The assembly of claim 7, the support extending perpendicularly inward from the backside of the bracket to recess the hook within the bracket.

10. The assembly of claim 7, the brace being attached at each side of the opening on the backside of the bracket via at least one attachment mechanism.

11. The assembly of claim 10, wherein the brace is welded to the bracket.

12. The assembly of claim 11, wherein a distal end of the hook is attached to the support via at least one bolt.

13. A tow-hook assembly for a vehicle, comprising:
a bracket defining an opening configured to receive a hook; and
a brace attached to a backside of the bracket and including a projection extending through the opening to an opposite side of the bracket, the brace including a support extending from the projection and configured to attach to a portion of the hook to recess the hook within the bracket, wherein a distal end of the hook is attached to the support via at least one bolt.

14. The assembly of claim 13, the projection forming a semi-circular shape within the opening of the bracket.

15. The assembly of claim 13, the support extending perpendicularly inward from the backside of the bracket to recess the hook within the bracket.

16. The assembly of claim 13, the brace being attached at each side of the opening on the backside of the bracket via at least one attachment mechanism.

17. The assembly of claim 16, wherein the brace is welded to the bracket.

* * * * *